Figure 1:
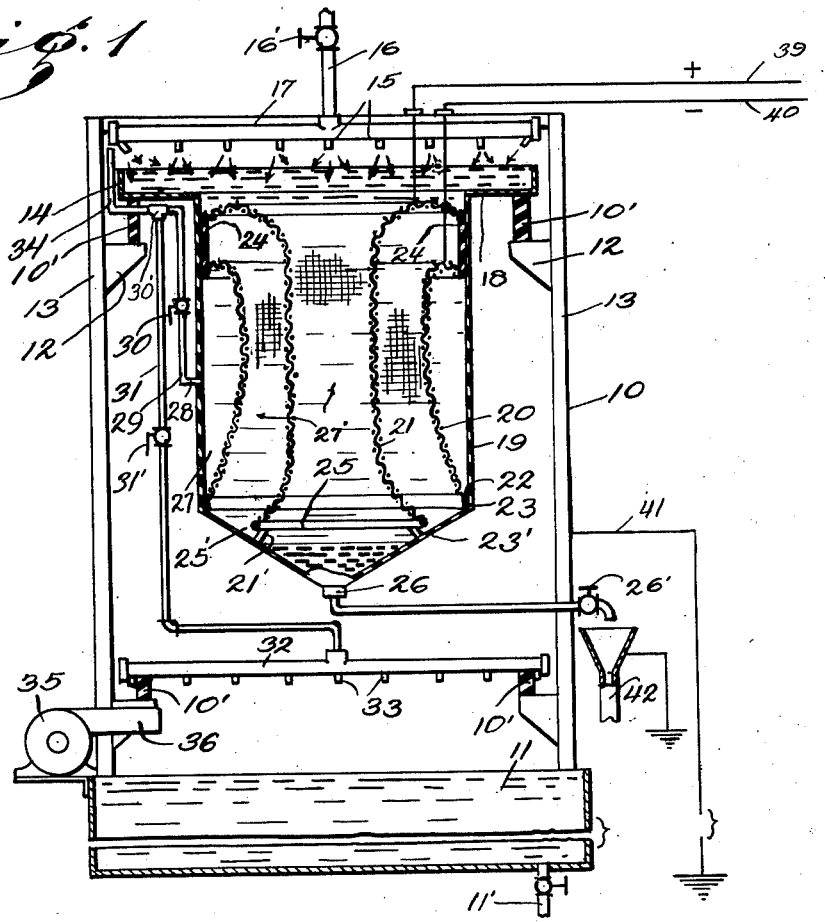

May 26, 1953  P. E. WHITTINGTON  2,640,026
ELECTRIC FILTERING APPARATUS
Filed June 22, 1950

INVENTOR.
Paul E. Whittington
BY
W. J. Eccleston
ATTORNEY

Patented May 26, 1953

2,640,026

UNITED STATES PATENT OFFICE 2,640,026

ELECTRIC FILTERING APPARATUS

Paul E. Whittington, Arlington, Va.

Application June 22, 1950, Serial No. 169,764

2 Claims. (Cl. 204—302)

(Granted under Title 35, U. S. Code (1952), sec. 266)

The invention described herein, if patented, may be manufactured and used by or for the Government for governmental purposes, without the payment to me of any royalty thereon.

This application is a continuation-in-part of my application Serial No. 51,003, filed September 24, 1948, for Electrostatic Filter, now abandoned. The invention herein relates to an improved electric filtering apparatus for purifying or clarifying liquids and separating solids from liquids. More particularly, the invention is concerned with the concentration and separation from liquids of suspended bodies, impurities or contaminants in the nature of slightly soluble salts, particulate matter, water-borne industrial wastes, and bodies or materials capable of suspension.

With respect to water and organic liquid materials which are conductors or act as conductors of electricity, methods of electrical separation as heretofore known are subject to carrying off an electric charge through the liquid and piping entering and leaving the filter. The liquid in the pipe and the pipe itself act as a ground, nullifying the effectiveness of the electrical charge.

Accordingly, it is an object of the invention to provide an improved method and apparatus for filtering water and organic liquids which are more or less conductors of electricity.

An additional object of this invention is to provide an improved filtering apparatus for liquids which are electrically conductive, wherein the electro-osmotic effect of charged filter plates and charged suspended particles is disregarded as being too small to move the particles any practical distance through the liquid in the time required for practical filtration.

A further object of this invention is to provide an improved method and apparatus for hydraulically moving a liquid body, for separation of foreign material and impurities contained therein, through generally vertical concentric metal filter screens or sleeves, to a point wherein the force exerted by the charged filter screens can act on a foreign material contained in the liquid and restrain such material from passing through the filter into a clarified portion of the liquid.

Another object of this invention is to provide a first container for electrically filtering suspended matter from a liquid, separating and retaining the suspended matter in this container while hydraulically passing the clarified liquid from the first container into a second liquid container without a physical and continuous conductive surface between the liquid bodies in the first container and the second container and finally withdrawing the separated matter with retention of a substantially constant liquid volume in the first container.

A further object of this invention is to provide an improved filtering apparatus wherein the filtering elements are readily insertable and easily replaceable within the filtering unit.

Figure 2:
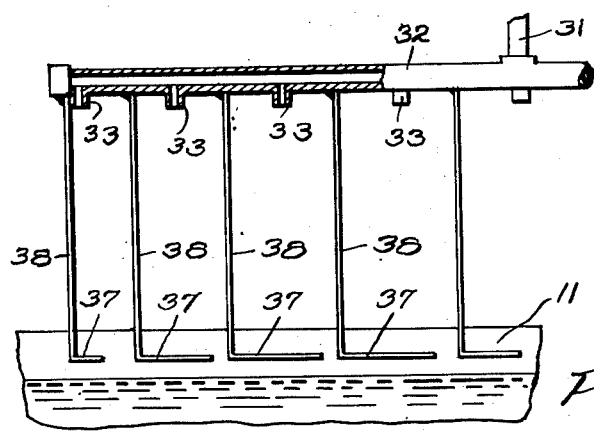

Further objects, advantages and adaptations will be apparent from the following description and the accompanying drawings, wherein:

Figure 1 is a front elevational view partly in section, showing the filter structure embodying this invention; and Figure 2 is a modified illustration of water outlet means to be utilized in Figure 1.

Referring to the drawings, a frame structure 10 is stationed in upright position to support a container and filter tank structure, as hereinafter described, above the level of a liquid-receiving tank 11. The brackets 12, mounted on uprights 13 of frame structure 10, support, upon insulating blocks 10', a receiving tank 14, into which liquids containing suspended matters are sprayed by a plurality of suitable nozzle sprayers 15. These nozzle sprayers 15 are fed by conduit 16 and its associated detachable head 17 from a well or other suitable source (not shown). A valve 16' of conventional character in conduit 16 may be utilized to control liquid flow into tank 14.

For purposes of illustration, the liquid feed source supplying conduit 16 may be from a water well, pipe line or tank of conventional character, and the water is sprayed into the receiving tank 14, in the manner as hereinafter described, to provide discontinuous liquid surfaces through which an electrical current cannot flow.

Suspended from the base 18, of receiving tank 14, is a filter tank or container 19, formed of non-conductor or poor conductor material in the nature of wood, glass, porcelain or enameled metallic material and the like, within which is vertically mounted a pair of concentrically spaced annular metallic conductor screens or foraminous sleeves 20 and 21 of fine mesh and adapted to conduct electrical currents. The screen 20 is supported at its lower end by a semi-flexible insulating ring 22, which is mounted in fluid-tight relationship to the container wall 23 at its juncture with base 23'. The upper portion of the screen 20 is mounted on the semi-flexible insulating ring 24, which rests in fluid-tight relationship against the uppermost portion of the container wall 23. The upper portion of screen 21 is also mounted on insulating ring 24 in spaced relationship to the screen 20 and the lower portion of screen 21 is suspended in uniformly spaced relationship to screen 20 substantially throughout its length. The lower end of screen 21 is supported by holding ring 25 which is mounted slightly above the base 23' of container 19 by spaced supports 21'. The small by-pass 25' under ring 25 permits a settling of solids into the base container 19 during shut-down periods or during cleaning of the apparatus, and any slight flow of suspended or contaminating matter under screen 21 towards screen 20 is found not to be harmful.

By reason of the semi-flexible nature of the insulating rings 22 and 24 the screens 20 and 21 may be readily withdrawn from the container 19, upon removal of header 17, for cleaning or replacement, and when the unit is reinserted screen 20 is fitted at its ends against the container wall 23 whereby fluid compartments are provided which divide container 19 into a clarifying liquid containing section 27 and a suspension or contaminated liquid containing section 27'.

An outlet conduit 28, for the chamber space 27, is positioned in the wall 23 at a point below the liquid level normally maintained when the apparatus is in operation. Attached to the outlet conduit 28 is a vertical outlet pipe 29 adapted to be controlled by hand valve 30. Fluid flow passes upwardly through conduit 29 from outlet 28, due to the static liquid head in tank 14, thence through conduit 31, when valves 30 and 31' are open, into the header 32 and is discharged through a series of spray nozzles 33 into receiving tank 11. Coupled with the conduits 29 and 31 is a vent pipe 34. This vent pipe 34 is connected by a suitable and conventional T-pipe fitting 30' and has its open end extended above the filter screens 20 and 21 and preferably above the normal liquid level of the fluid contained within tank 14. The vent pipe 34 may be provided with a suitable vent valve, if desired. This arrangement prevents siphoning of liquid from container 19 below the level of the T-pipe fitting and screen 21 during operation of the apparatus. As illustrated by Figure 1, the T-pipe fitting 30' is positioned slightly above the insulating ring 24 and substantially in alignment with the top portion of filter screen 21. As heretofore indicated, this arrangement is provided in order to prevent, during fluid flow, the normal liquid level in container 19 from falling below the top of screen 21 and also aid in maintaining the separation of suspended matter from clarified liquid.

The spray nozzles 33 are provided to operate in a manner similar to spray nozzles 15, to prevent the carrying off of an electric charge by a continuous liquid stream. That is, the spray nozzles 15 and 33 break up the continuous water streams from the headers 17 and 32, respectively, into fine droplets, thus providing a broken film or discontinuous surface through which current does not flow. Oftentimes, when insufficient pressure is provided by the static waterhead in tank 14, it has been found that further positive continuous flow-breaking means is necessary, and there may be provided, for example, as shown in Figure 1, an air-blower 35, adapted to supplement the spray nozzles 33 by directing a blast of air from nozzle 36 directly through the spray as it flows from nozzles 33. Otherwise, rotating nozzles with a suitable header may replace the nozzles 33 and header 32, if desired.

Further, in lieu of the blower 35 or in conjunction therewith, there is provided, as disclosed in Fig. 2, a plurality of spatter plates 37, suspended by splash plates 38 below each of the nozzles 32, respectively. In either instance, the stream of blowing air, with or without the use of the plates 37 or vice versa, causes the discharged water to fall into the receiver tank 11 in droplet form without affording a continuous conductive surface. The clarified liquid in container 11 may be withdrawn through controlled outlet 11' or by any suitable means.

The screens 20 and 21 are electrically connected to opposite poles of a source of current (not shown) by electric conductors 39 and 40. A suitable ground 41 may be provided on frame 10 to prevent the accidental building up of any static charge. The screens 20 and 21, as indicated, are vertically mounted or positioned within container 19, to perform the functions of separating a liquid from its suspended contaminating material, concentrate suspended matter, serve as mechanical filters in addition to providing an electric filtration of the liquid, and further, aid in passing liquids and contaminants into and from the electrical filtering operation. The centrally disposed vertical screen 21 is positioned circumferentially under the inflow of liquid which is to be filtered in a manner which causes impure liquid and separated matter to be suspended in section 27' or to settle and pass into the outlet 26.

The voltage to be applied to the screens may be adjusted in accordance with the properties of the liquid to be purified, particularly with regard to the conductivity of the liquid. For example, voltages of 35–100 v. were found suitable; particularly good results were obtained in water purification of 45 v.

To illustrate the operation of this arrangement, a positive head of contaminated and impure liquid is maintained in the tank 14 by spray nozzles 15, forcing fluid flow through the screens 21 and 20 into space 27. A portion of those particles which pass through the opening 25' at the bottom of screen 21 and those which pass through the screen 21 without having their original charge affected will retain a positive or a negative charge, and, when hydraulically moved near screen 20, which is connected to the negative pole, will be attracted to or repelled by screen 20 dependent upon the relative electrical charges. A portion of those particles having a positive charge and those assuming a positive charge when passing through screen 21, will in turn be attracted to particles on screen 20 and thereby are entrapped with the unattached positively charged suspended particles in the space between the screens. Coarse material will be mechanically filtered by screens 20 and 21 and some negatively charged particle will be attracted to screen 21. Thus, the liquid, passing first through the screen 21 and thence through the screen 20, is purified of suspended particles. Thereby the liquid is clarified and purified and due to the static head or liquid level maintained by controlled liquid flow into receiving container 14, is forced out of the chamber portion 27, by way of outlet conduit 28 and into the header 32. From header 32 the filtered liquid is discharged into the receiving tank 11 by sprayers 33 in the manner described.

It will be understood that the electrical conductors 39 and 40 may be reversed with respect to screens 20 and 21, if desired.

At periodic intervals the electrical operation of the apparatus may be cut off and the valve 30 closed, with or without closing of valve 16', to permit drainage from the container 19 of the impurities and suspended matters which have been retained by the screens 20 and 21. Due to their concentration these impurities will settle by gravity to the hopper bottom above outlet 26 and may be disposed of through drain 42 by normal gravity flow of the liquid when valve 26' is opened. In the event valve 26' is opened while the current is on, the drain 42 is provided with a conventional conductor to ground any charge which may be carried by the discarded liquid. Otherwise, the outlet 26 may be provided with a discharge device in the nature of suitable spray or slug disposal structure to avoid grounding the filter unit.

Without the charges on screens 20 and 21, impurities or contaminants would pass into the clarified liquid receiving space 27. Particularly is this true, when an outflow of liquid and restrained substances is simultaneously supplemented by an inflow of liquid from conduit 16. It is therefore more desirable to drain the container 19 of restrained matter after a time interval of shutdown with valve 16' closed and the current turned off, then upon opening outlet valve 26 and correlating liquid inflow through valve 16', the current is again turned on to maintain a filtering action. In any case, it is preferable, during filtering or withdrawal of suspended matter, while simultaneously maintaining fluid inflow, and outflows, the current supply should be connected to the filter screens to keep the clarified portion of the liquid clear of separated suspended matter.

As described, the unit comprises a filter structure which may be constructed to provide for any capacity desired in a filtering system, or the filter structure may be one of a series of devices utilized in a system. The nature of the impurities removed by such apparatuses is on the order of that which cannot be passed through screens, due to relative size and, further, those particles and impurities which will be filtered out by the electrical current on the vertically mounted screens. Such impurities may be industrial wastes, suspended soil, bacteria, fungi, products of fermentation, products of polymerization in their respective solvents, and the like.

In accordance with the patent statutes, I have described in detail what I now consider to be the preferred form of the invention, but it will be obvious that various minor changes may be made in the structural details without departing from the spirit of the invention, and it is intended that all such changes be included within the scope of the appended claims.

I claim:

1. Liquid filtering apparatus comprising an upstanding tank for holding liquid and having an opening in its top for receiving the liquid and including a bottom having a sediment drain opening, the tank having a clear liquid discharge opening in its side wall a substantial distance above the bottom of the tank, means for continuously introducing liquid into the top of the tank so that the tank is maintained substantially full during operation of the apparatus, inner and outer annular metallic filter screens arranged within the tank in generally vertical concentrically spaced relation and extending throughout the major portion of the height of the tank, the upper portions of the inner and outer filter screens extending generally radially to the side wall of the tank and being connected therewith at the marginal edges of the filter screens in vertically spaced relation, the lower end of the inner filter screen being spaced from the bottom of the tank to provide a passage for sediment passing to the bottom of the tank, the lower end of the outer filter screen being connected with the side wall of the tank, the outer filter screen being spaced inwardly of the side wall throughout substantially its entire length forming a clear liquid chamber communicating with said clear liquid discharge opening, and means for establishing an electrostatic field between the inner and outer filter screens.

2. Liquid filtering apparatus comprising an upstanding tank to receive liquid and having its top open and including a bottom having a sediment drain opening, the tank being provided in its side wall with a clear liquid discharge opening arranged a substantial distance above the bottom of the tank, a first generally vertical annular metallic filtering sleeve arranged within the tank and extending throughout the major portion of the height of the tank and spaced from the side wall of the tank in substantially concentric relation therewith, the first filtering sleeve extending generally radially outwardly at its upper end and near the top of the tank and having its circumferential edge secured to the side wall of the tank, the lower end of the first filtering sleeve being spaced from the bottom of the tank, a second generally vertical annular metallic filtering sleeve arranged within the tank between the first filtering sleeve and side wall of the tank and being shorter than the first filtering sleeve and having its lower end secured to the side wall of the tank near the bottom of the same and a substantial distance below said clear liquid discharge opening, the upper end of the second filtering sleeve extending generally radially outwardly toward the side wall of the tank above the clear liquid discharge opening and being secured thereto at its circumferential edge and spaced below the upper end of the first filtering sleeve in superposed relation, and electrical means connected with first and second filtering sleeves for establishing an electrical field between the same.

PAUL E. WHITTINGTON.

References Cited in the file of this patent

UNITED STATES PATENTS

| Number | Name | Date |
| --- | --- | --- |
| 1,440,776 | Eddy | Jan. 2, 1923 |
| 2,028,520 | Phillips | Jan. 21, 1936 |
| 2,116,509 | Cottrell | May 10, 1938 |
| 2,204,982 | Dahling | June 18, 1940 |
| 2,414,741 | Hubbard | Jan. 21, 1947 |